US011210739B1

(12) United States Patent
DeLuca et al.

(10) Patent No.: US 11,210,739 B1
(45) Date of Patent: Dec. 28, 2021

(54) DYNAMIC PRICING OF DIGITAL TWIN RESOURCES

(71) Applicant: International Business Machines Corporation, Armonk, NY (US)

(72) Inventors: Lisa Seacat DeLuca, Baltimore, MD (US); Chandler Maskal, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/031,970

(22) Filed: Sep. 25, 2020

(51) Int. Cl.
*G06Q 40/00* (2012.01)
*G06Q 40/04* (2012.01)
*G06Q 40/06* (2012.01)
*G06Q 30/02* (2012.01)

(52) U.S. Cl.
CPC ......... *G06Q 40/04* (2013.01); *G06Q 30/0206* (2013.01); *G06Q 40/06* (2013.01)

(58) Field of Classification Search
CPC .... G06Q 40/00; G06Q 40/04; G06Q 30/0206; G06Q 40/06
See application file for complete search history.

(56) References Cited

U.S. PATENT DOCUMENTS

| 8,332,260 | B1 | 12/2012 | Mysen |
| 8,566,143 | B2 | 10/2013 | Oren |
| 9,076,148 | B2 | 7/2015 | Valz |
| 2010/0241491 | A1 | 9/2010 | Eglen |
| 2016/0247129 | A1 | 8/2016 | Zhen |
| 2018/0039249 | A1 | 2/2018 | Johnson |
| 2019/0384870 | A1 | 12/2019 | Shiraishi |
| 2021/0248289 | A1* | 8/2021 | Fasano .................. G05B 17/02 |

FOREIGN PATENT DOCUMENTS

| EP | 3514715 A1 | 7/2019 |
| KR | 101084841 B1 | 11/2011 |
| WO | 2018234741 A1 | 12/2018 |

OTHER PUBLICATIONS

Digital Twin-driven Supply Chain Planning Y Wang, X Wang, A Liu—Procedia CIRP, 2020—Elsevier (Year: 2020).*
IBM, "IBM Maximo Asset Monitor", United States, Jul. 6, 2020, 1 page.
IBM, "IBM Watson IoT Platform", United States, Jul. 6, 2020, 1 page.

(Continued)

*Primary Examiner* — Lalita M Hamilton
(74) *Attorney, Agent, or Firm* — Stephen R. Yoder (57) ABSTRACT

Real-time market activity of one or more physical assets are monitored via a plurality of Internet of Things sensors and operational history of each physical asset of the one or more physical assets. One or more digital twin resources associated with each physical asset of the one or more physical assets are also monitored. At least one market change which affects at least one of the monitored one or more physical assets and the respectively associated monitored one or more digital twin resources associated with each physical asset of the one or more physical assets are identified. Based on the at least one identified market change, a price for a digital twin resource available for purchase in a digital twin content store is dynamically adjusted.

17 Claims, 3 Drawing Sheets

(56) References Cited

OTHER PUBLICATIONS

Langkamp et al., "How the Internet of Things Will Change the Pricing of Things", Boston Consulting Group, Dec. 7, 2017, 12 pages.
Oi et al., "Enabling technologies and tools for digital twin", Article in Journal of Manufacturing Systems, DOI: 10.1016/i.jmsy.2019.10.001, Oct. 2019, 20 Pages.
Rasheed et al., "Digital Twin: Values, Challenges and Enablers", arXiv preprint, arXiv:1910.01719v1 [eess.SP], Oct. 3, 2019, 31 Pages.

* cited by examiner

DYNAMIC PRICING OF DIGITAL TWIN RESOURCES

BACKGROUND

The present invention relates generally to the field of digital twins, and more particularly to dynamically pricing resources in a digital twin marketplace based on active usage patterns of associated physical assets.

A digital twin is a virtual representation of a physical object or system. Connected sensors on the physical object (i.e., asset) collect real-time data that is mapped to the virtual representation (i.e., model). The model uses the mapped data as input to output predictions or simulations of how the physical asset will be affected by the input. Digital twins integrate the Internet of Things (IoT), artificial intelligence (AI), machine learning (ML), and software analytics to generate the predictions and/or simulations. A digital twin marketplace (or exchange, store, etc.) connects the manufacturers of various physical assets (e.g., jet aircraft, mining equipment, railroad engines, etc.) and the owners/operators of said assets. Content available for purchase from the digital twin store includes, but is not limited to, parts lists, bills of material, user manuals, maintenance/service manuals, and augmented/virtual reality models.

SUMMARY OF THE INVENTION

Embodiments of the present invention include an approach for dynamically pricing resources in a digital twin marketplace. In one embodiment, real-time market activity of one or more physical assets are monitored via a plurality of Internet of Things sensors and operational history of each physical asset of the one or more physical assets. One or more digital twin resources associated with each physical asset of the one or more physical assets are also monitored. At least one market change which affects at least one of the monitored one or more physical assets and the respectively associated monitored one or more digital twin resources associated with each physical asset of the one or more physical assets are identified. Based on the at least one identified market change, a price for a digital twin resource available for purchase in a digital twin content store is dynamically adjusted.

DETAILED DESCRIPTION

Embodiments of the present invention recognize that pricing resources available for sale, whether in a brick and mortar store or a digital twin marketplace, is often driven by various market influences. A change in the market (e.g., a part recall, introduction of a new product from a competitor, a change to a component part, etc.) may drive the need for a rapid price adjustment of a resource. Monitoring the market for changes is labor intensive and time consuming. Further, a human is tasked with determining an appropriate price adjustment based on the market change. A tool is needed that can monitor the market and suggest price changes dynamically based on any observed change in the market.

Embodiments of the present invention recognize that there may be a method, computer program product, and computer system for dynamically pricing resources in a digital twin (DT) marketplace based on active usage patterns of associated physical assets. The method, computer program product, and computer system provide an improvement to the DT technology, specifically the field of pricing DT resources. The improvement allows for fast, automatic pricing of DT resources based on current, real-time market activity of similar resources or associated physical assets. In an embodiment, a DT store is created which includes a plurality of DT resources. In the embodiment, DT resources include, but are not limited to, parts lists, bills of material, user manuals, maintenance/service manuals, and augmented/virtual reality models. Further in the embodiment, a baseline price for each DT resource in the plurality of DT resources is received along with minimum and maximum price thresholds. Further yet in the embodiment, an indication of dynamic pricing of the DT resources is received from the content owner. Further yet in the embodiment, physical assets in the marketplace are monitored via any number of sensors associated with said physical assets and operating histories of said physical assets are stored for later use. Further yet in the embodiment, a market change is identified based on the monitored physical assets and/or their operating histories which affects one or more DT resources. Further yet in the embodiment, a price adjustment is determined based on the market change, and a further determination is made whether said price adjustment exceeds a price threshold. Responsive to determining that said price adjustment does not exceed a price threshold, the price of the one or more DT resources is dynamically adjusted based on the active usage patterns of one or more physical assets in the marketplace.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
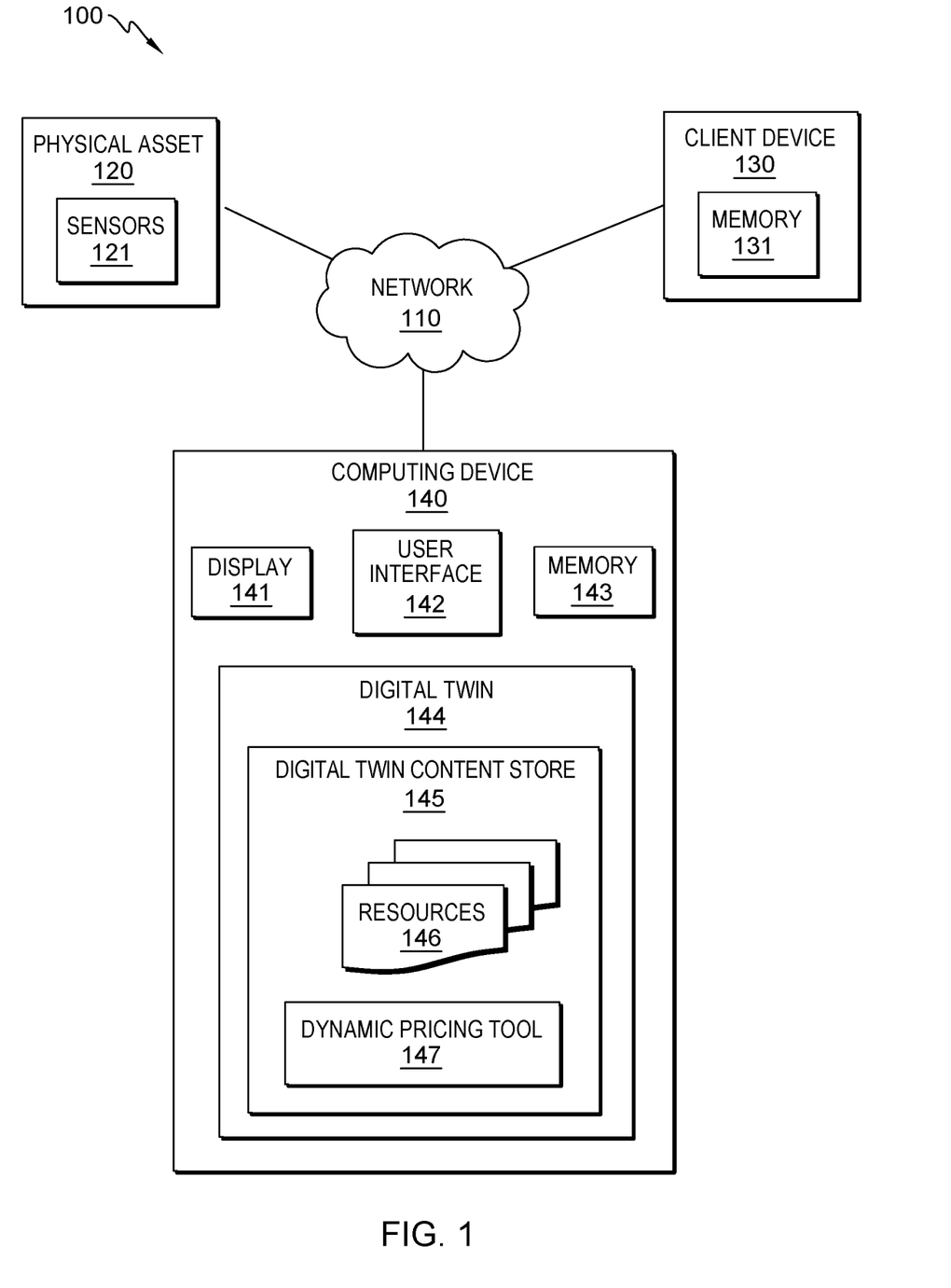
FIG. 1 depicts a functional block diagram illustrating a computing environment which includes a dynamic pricing tool, in accordance with an embodiment of the present invention.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes physical asset 120, client device 130, and computing device 140, interconnected by network 110. In example embodiments, computing environment 100 includes other computing devices (not shown in FIG. 1) such as smartwatches and other wearable technology, cell phones, smartphones, phablets, tablet computers, additional laptop computers, additional desktop computers, other computer servers, or any other computer system known in the art, interconnected with physical asset 120, client device 130, and computing device 140 over network 110.

In embodiments of the present invention, physical asset 120, client device 130, and computing device 140 are connected to network 110, which enables physical asset 120, client device 130, and computing device 140 to access other computing devices and/or data not directly stored on physical asset 120, client device 130, and computing device 140. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between physical asset 120, client device 130, and computing device 140, and any other computing devices (not shown in FIG. 1) connected to network 110, in accordance with embodiments of the present invention.

According to an embodiment, physical asset 120 is any physical object or system for which a digital twin (DT) can be created. In an embodiment, physical asset 120 may be a simple object such as a weathervane, or a much more complex item such as a nuclear submarine. Other examples of physical asset 120 include, but are not limited to, household appliances (e.g., washing machines; dryers; refrigerators; ranges; coffee makers; heating, ventilation, and air conditioning equipment; water heaters; and the like), manufacturing equipment (e.g., drill presses; computer numerical control machines, vacuum presses, thermal ovens, and the like), vehicles for transportation (e.g., mopeds; motorcycles; automobiles; pickup trucks; buses; airplanes; jets; and the like), equipment used for various industries (e.g., construction; mining; food production; farming; energy production; and the like), and all of the various components used in the previous example (e.g., one or more jet engines the enable the jet to fly). There are any number of physical asset 120 in computing environment 100. According to an embodiment, physical asset 120 includes sensors 121.

In an embodiment, sensors 121 are a plurality of sensors associated with physical asset 120 used for monitoring various attributes of physical asset 120. Sensors 121 may be connected to physical asset 120 via wired or wireless connection (not shown in FIG. 1) and sensors 121 may not be connected to physical asset 120 (e.g., in the case of a camera). In the embodiment, sensors 121 measure attribute data of physical asset 120. Examples of sensors 121 include, but are not limited to, sensors to measure temperature, pressure, humidity, noise, vibration, water quality, water detection, gas/air quality, electrical current, voltage, fluid level, angular velocity, light, smoke, infrared radiation, motion, vision, location, and the like. According to an embodiment, sensors 121 are connected to network 110 via at least a wired or a wireless connection. Via the network 110 connection, sensors 121 provide various sensor data (i.e., measured attribute data) to any number of digital twins, such as digital twin 144 (discussed below) and to any other monitoring equipment (not shown in FIG. 1). There are any number of sensors 121 connected to physical asset 120.

According to an embodiment of the present invention, client device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 130 can be a standalone computing device, a management server, a web server, a mobile computing device, or any other electronic device or computing system capable of receiving, transmitting, and processing data. In other embodiments, client device 130 can represent computing systems utilizing multiple computers as a server system, such as in a cloud computing environment. In certain embodiments, client device 130 represents a computer system utilizing clustered computers and components (e.g., database server computers, application server computers, etc.) that act as a single pool of seamless resources when accessed by elements of computing environment 100. In general, client device 130 is representative of any electronic device or combination of electronic devices capable of executing computer readable program instructions. In an embodiment, computing environment 100 includes any number of client device 130. Client device 130 may include internal and external hardware components as depicted and described in further detail with respect to FIG. 3, in accordance with embodiments of the present invention. According to an embodiment of the present invention, client device 130 includes memory 131.

In an embodiment, memory 131 is storage that is written to and/or read by programs and applications on client device 130. In one embodiment, memory 131 resides on client device 130. In other embodiments, memory 131 resides on physical asset 120 or on any other device (not shown in FIG. 1) in computing environment 100, in cloud storage, or on another computing device accessible via network 110. In yet another embodiment, memory 131 represents multiple storage devices within client device 130. Memory 131 may be implemented using any volatile or non-volatile storage media for storing information, as known in the art. For example, memory 131 may be implemented with a tape library, optical library, one or more independent hard disk drives, multiple hard disk drives in a redundant array of independent disks (RAID), solid-state drives (SSD), or random-access memory (RAM). Similarly, memory 131 may be implemented with any suitable storage architecture known in the art, such as a relational database, an object-oriented database, or one or more tables. In an embodiment of the present invention, any programs and applications (not shown in FIG. 1) operating on client device 130 may store, read, modify, or write data to memory 131. In an embodiment of the present invention, data stored to memory 131 includes, but is not limited to, data stored by a user of client device 130 such as various digital twin resources.

According to an embodiment of the present invention, computing device 140 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, computing device 140 can be a standalone computing device, a management server, a web server, a mobile computing device, or any other electronic device or computing system capable of receiving, transmitting, and processing data. In other embodiments, computing device 140 can represent computing systems utilizing multiple computers as a server system, such as in a cloud computing environment. In certain embodiments, computing device 140 represents a computer system utilizing clustered computers and components (e.g., database server computers, application server computers, etc.) that act as a single pool of seamless resources when accessed by elements of computing environment 100. In general, computing device 140 is representative of any electronic device or combination of electronic devices capable of executing computer readable program instructions. In an embodiment, computing environment 100 includes any number of computing device 140. Computing device 140 may include internal and external hardware components as depicted and described in further detail with respect to FIG. 3, in accordance with embodiments of the present invention. In an embodiment, computing device 140 is substantially similar to client device 130. According to an embodiment of the present invention, computing device 140 includes display 141, user interface 142, memory 143, and digital twin (DT) 144.

According to an embodiment, display 141 is an electronic visual device for a desktop computer, laptop computer, tablet computer, smartphone, smart-watch, and the like. Display 141 may include a touchscreen which is an input device layered on top of the display for allowing a user to control an electronic device via simple or multi-touch gestures by touching display 141 with a special stylus and/or one or more fingers. Display 141 displays open programs and applications, such as an email program, allowing a user of computing device 140 to interact with the open programs and applications via a keyboard, mouse, and buttons (not shown in FIG. 1). Display 141 may be a thin film transistor liquid crystal display (TFT-LCD), a flat panel LED (light emitting diode) display, a cathode ray tube (CRT), or any type of display device known in the art or developed in the future. Display 141 may be connected to computing device 140 via VGA (video graphics array), DVI (digital video interface), HDMI (High Definition Multi-Media Interface), or any other connection type known in the art or developed in the future. According to an embodiment, display 141 visually presents information from DT 144 such as resources 146 and dynamic pricing tool 147 (both discussed below).

In an embodiment, user interface 142 provides an interface between a user of computing device 140 and DT 144. User interface 142 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 142 may also be mobile application software that provides an interface between computing device 140 and dynamic pricing tool 147. Mobile application software, or an "app," is a computer program designed to run on smartphones, tablet computers and other mobile devices. User interface 142 enables a user of computing device 140 to interact with DT content store 145 (discussed below), any other programs and applications included on computing device 140 (not shown in FIG. 1), and any other computing devices (not shown in FIG. 1).

According to an embodiment, memory 143 is storage that is written to and/or read by dynamic pricing tool 147, and any other programs and applications on computing device 140. In one embodiment, memory 143 resides on computing device 140. In other embodiments, memory 143 resides on physical asset 120, client device 130, or on any other device (not shown in FIG. 1) in computing environment 100, in cloud storage, or on another computing device accessible via network 110. In yet another embodiment, memory 143 represents multiple storage devices within computing device 140. Memory 143 may be implemented using any volatile or non-volatile storage media for storing information, as known in the art. For example, memory 143 may be implemented with a tape library, optical library, one or more independent hard disk drives, multiple hard disk drives in a redundant array of independent disks (RAID), solid-state drives (SSD), or random-access memory (RAM). Similarly, memory 143 may be implemented with any suitable storage architecture known in the art, such as a relational database, an object-oriented database, or one or more tables. In an embodiment of the present invention, dynamic pricing tool 147, and any other programs and applications (not shown in FIG. 1) operating on computing device 140 may store, read, modify, or write data to memory 143. According to an embodiment, memory 143 is substantially similar to memory 131. In an embodiment of the present invention, data stored to memory 143 includes, but is not limited to, data stored by dynamic pricing tool 147 such as baseline prices, minimum and maximum price thresholds, and data associated with dynamic pricing suggestions.

In an embodiment, digital twin (DT) 144 is a digital replica (i.e., a virtual representation) of physical asset 120. According to embodiments of the present invention, DT 144 receives data over network 110 from sensors 121 associated with physical asset 120. DT 144 analyzes the received data using artificial intelligence (AI), machine learning (ML), and software analytics to create one or models that simulate physical asset 120; the one or more models update based on actual changes to physical asset 120 and the updating occurs in near real-time. In addition to learning from itself, the learning system of DT 144 is able to learn from human experts, from a single and a fleet of other similar machines, from the system and environment of which it is a part of, and from historical data of past usage of DT 144. In an embodiment, there are any number of DT 144 in computing device 140. In the embodiment, DT 144 includes digital twin (DT) content store 145, resources 146, and dynamic pricing tool 147.

According to an embodiment, DT content store 145 is a digital twin exchange or marketplace that offers digital twin resources, such as resources 146 (discussed below), for sale to consumers. Owners/operators of physical assets (such as physical asset 120) can visit DT content store 145, which is accessible over the Internet, to compare available resources of multiple manufacturers to aid in buying decisions for new equipment. In an embodiment, DT content store is on computing device 140. In another embodiment, DT content store 145 is on client device 130 or any other computing device available via network 110 in computing environment 100. In the embodiment, there are any number of DT content store 145 on computing device 140 and in computing environment 100.

In an embodiment, resources 146 are a plurality of DT resources which comprise the items available for purchase in DT content store 145. According to an embodiment, a physical asset, such as physical asset 120, may have the following resources available for sale in DT content store 145 (note that the list is not exhaustive): a bill of material; a parts list; one or more user manuals; engineering manuals; fault codes; two and three dimensional computer aided design (CAD) files; augmented/virtual reality models; maintenance manuals; maintenance plans; one or more operating models; remote procedures for 'technicians of the future'; a stocking strategy; building information models (BIM); service manuals; and the like. These resources are considered 'digital twin templates' because they are repeatable to any physical asset (i.e., not only physical asset 120). The templates are the beginning to creating an 'operating twin' which is a one-to-one relationship between a digital resource and a physical asset. In an embodiment, resources 146 are included in DT content store 145 on computing device 140. In another embodiment, resources 146 are included on client device 130 or on any other computing device accessible via network 110 in computing environment 100. In the embodiment, DT content store 145 may have any number of resources 146.

According to an embodiment of the present invention, dynamic pricing tool 147 is a program, a subprogram of a larger program, an application, a plurality of applications, or mobile application software, which functions to monitor physical assets via Internet of Things sensors, store and analyze operational history of said physical assets, and dynamically price resources in a digital twin marketplace that are associated with said physical assets based on active usage patterns of said physical assets. Dynamic pricing tool 147 provides an improvement to the technology of digital twins in general, and more specifically, to the field of pricing digital twin resources by providing a dynamic response to market activity of physical assets associated with the digital twin resources, where the response is an automated price adjustment. A program is a sequence of instructions written to perform a specific task. In an embodiment, dynamic pricing tool 147 runs independently. In other embodiments, dynamic pricing tool 147 depends on system software and/or other programs (not shown in FIG. 1) to execute. According to an embodiment, dynamic pricing tool 147 is a cognitive system based on artificial intelligence utilizing machine learning and deep learning that (i) receives DT resource pricing information, (ii) monitors the market for usage patterns of physical assets associated with the DT resources, and (iii) dynamically adjusts DT resource pricing based on market changes. In one embodiment, dynamic pricing tool 147 functions as a stand-alone program residing on computing device 140. In another embodiment, dynamic pricing tool 147 works in conjunction with other programs, applications, etc., (such as DT content store 145) found in computing environment 100. In yet another embodiment, dynamic pricing tool 147 resides on other computing devices such as client device 130 in computing environment 100, which are interconnected to computing device 140 via network 110.

According to an embodiment, dynamic pricing tool 147 receives and/or retrieves DT resource information and creates a DT content store. In the embodiment, dynamic pricing tool 147 receives baseline pricing information and price minimum/maximum thresholds. Further in the embodiment, dynamic pricing tool 147 receives an indication of dynamic pricing for the DT resources. Further yet in the embodiment, dynamic pricing tool 147 monitors resource activity in the market as well as usage patterns of the associated physical assets. Further yet in the embodiment, responsive to identifying a change in the market that affects one or more DT resources, dynamic pricing tool 147 determines a price adjustment of the one or more DT resources based on the identified change. Further yet in the embodiment, responsive to the price adjustment not exceeding a threshold, dynamic pricing tool 147 dynamically adjusts the price of the one or more DT resources.

Figure 2:
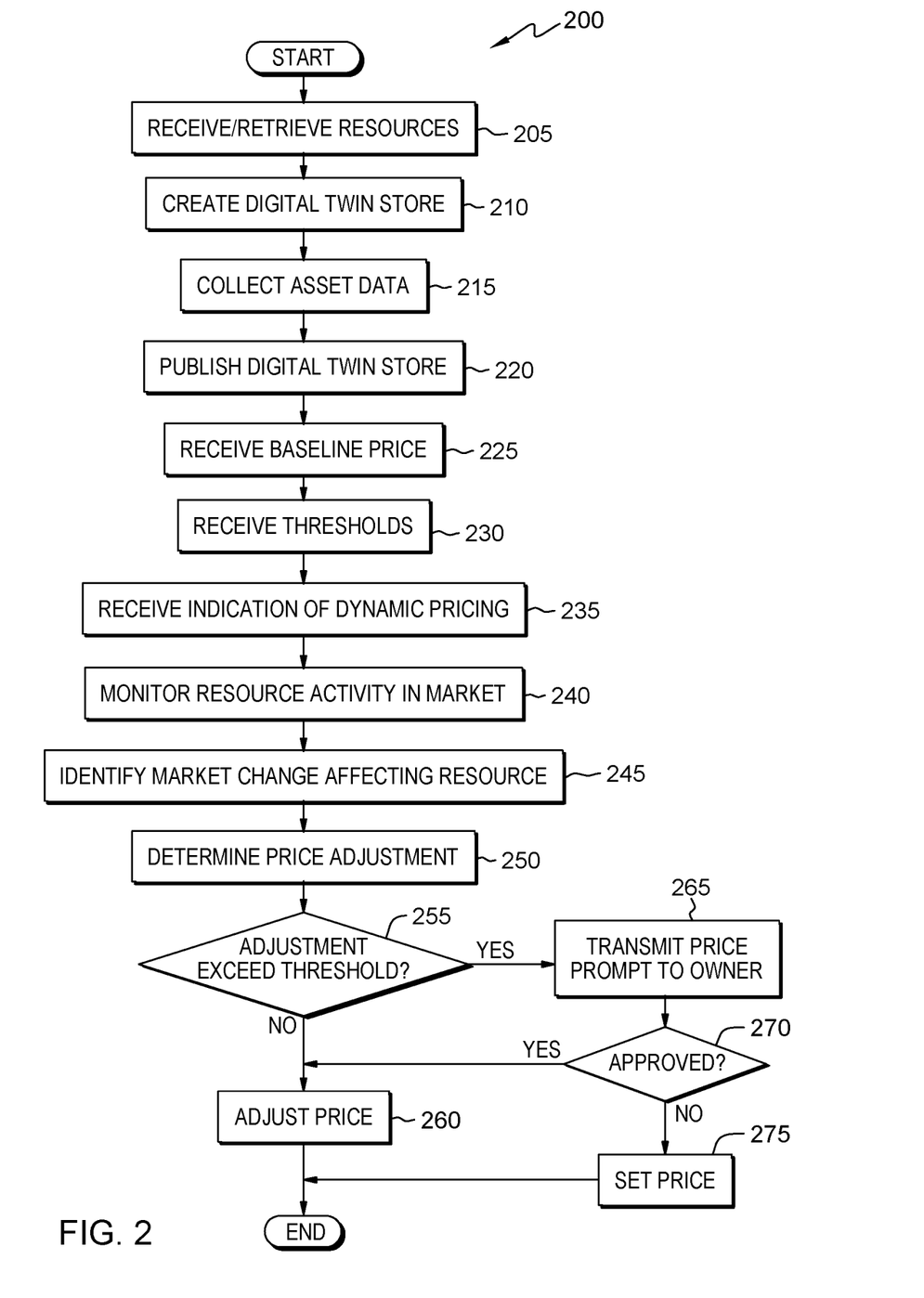
FIG. 2 is a flowchart depicting operational steps of a dynamic pricing tool for dynamically pricing resources in a digital twin marketplace, on a computing device within the computing environment of FIG. 1, in accordance with an embodiment of the present invention.

FIG. 2 is a flowchart of workflow 200 depicting a method for dynamically pricing resources in a digital twin marketplace based on active usage patterns of associated physical assets. In one embodiment, the method of workflow 200 is performed by dynamic pricing tool 147. In an alternative embodiment, the method of workflow 200 is performed by any other program in computing environment 100 working with dynamic pricing tool 147. In an embodiment, a user of computing device 140 invokes workflow 200 upon accessing DT content store 145 on computing device 140. In an alternative embodiment, a user of client device 130 invokes workflow 200 upon viewing DT content store 145.

In an embodiment, dynamic pricing tool 147 receives/retrieves resources (step 205). In other words, dynamic pricing tool 147 receives/retrieves digital twin (DT) resources. According to an embodiment, dynamic pricing tool 147 receives one or more DT resources from the resource owner. According to another embodiment, dynamic pricing tool 147 receives one or more requests to create one or more DT resources from one or more owners of physical assets. According to yet another embodiment, dynamic pricing tool 147 retrieves DT resources (e.g., from an existing DT marketplace). According to yet another embodiment, dynamic pricing tool 147 receives the DT resources from the manufacturer of the physical asset. In an embodiment, dynamic pricing tool 147 receives DT resources, such as resources 146, for physical asset 120 over network 110 from a user of client device 130; said user is the owner of physical asset 120. For example, a program on the laptop owned by Bill (who manages several DT exchanges for various companies) receives a set of DT resources from Joe (who owns a company that manufactures underground mining trucks).

According to an embodiment of the present invention, dynamic pricing tool 147 creates a DT store (step 210). In other words, dynamic pricing tool 147 creates a DT content store which is comprised of the received/retrieved DT resources. In an embodiment, dynamic pricing tool 147 creates the DT content store. In another embodiment, dynamic pricing tool 147, in conjunction with at least one other application, creates the DT content store. In yet another embodiment, the manufacturer of the physical asset creates the DT content store. According to an embodiment, dynamic pricing tool 147 creates DT content store 145, which includes at least resources 146, on computing device 140. For example, the program on the laptop creates a DT content store using the resources received from Joe associated with the underground mining trucks.

In an embodiment, dynamic pricing tool 147 collects asset data (step 215). In other words, dynamic pricing tool 147 collects data associated with one or more physical assets to create a digital twin for each of the one or more physical assets. According to an embodiment, dynamic pricing tool 147 receives data from one or more sensors associated with a physical asset and using artificial intelligence (AI), machine learning (ML), and software analytics, creates a DT of said physical asset. In the embodiment, dynamic pricing tool 147 further collects data from similar physical assets to supplement the associated DT resources. According to one embodiment, dynamic pricing tool 147 creates the DT. According to another embodiment, the physical asset manufacturer creates the associated DT. Said data includes, but is not limited to, usage parameters of the physical asset based on a plurality of sensors associated with said physical asset, operating history of said physical asset (e.g., the frequency of parts replaced, the maintenance performed, work orders opened, technicians assigned, etc.), manufacturer changes (e.g., changes based on warranty claims, required recalls, maintenance bulletins, etc.), and pricing by competitors of similar DT resources. In an embodiment, dynamic pricing tool 147 collects data from sensors 121 via network 110 on the operation of physical asset 120 and creates digital twin 144 (i.e., a virtual representation of physical asset 120) on computing device 140. For example, the program on the laptop owned by Bill collects data from a group of sensors on a new mining truck called 'SuperHaul' built by the company owned by Joe; based on the collected data the program creates 'SHDT', the 'SuperHaul' digital twin, on the laptop used by Bill.

According to an embodiment of the present invention, dynamic pricing tool 147 publishes a DT store (step 220). In other words, dynamic pricing tool 147 publishes the previously created DT content store on the Internet such that the DT resources which comprise the content store are available for consumers to review and purchase. In an embodiment, dynamic pricing tool 147 publishes the DT content store. In another embodiment, a manufacturer of a physical asset and associated DT publishes the DT content store. In the embodiment, the DT resources are dynamically configured in and displayed via a user interface which enables consumers to review and purchase said DT resources. For example, the user interface may display five DT resources available for sale—DT1, DT2, DT3, DT4, and DT5. The five DT resources are arranged from highest priced (i.e., DT1) to lowest priced (i.e., DT5). Following a refresh of the user interface, only four DT resources are displayed as DT2 is no longer available for purchase, and the four are rearranged in a lowest to highest price arrangement. Accordingly, the user interface now shows the following—DT5, DT4, DT3, and DT1. According to an embodiment, dynamic pricing tool 147 publishes DT content store 145 on computing device 140; in the embodiment, DT content store includes resources 146 and dynamic pricing tool 147. For example, the program on the laptop used by Bill publishes the previously created DT content store which is based on the DT resources from Joe for the underground mining trucks, including the new truck 'SuperHaul', its digital twin 'SHDT', and its associated DT resources.

In an embodiment, dynamic pricing tool 147 receives baseline price (step 225). In other words, responsive to the DT store being published, dynamic pricing tool 147 receives a baseline price for each of the DT resources available in the DT store. According to an embodiment, dynamic pricing tool 147 receives each baseline price from the owner of the DT resources. According to another embodiment, dynamic pricing tool 147 suggests a baseline price for each DT resource to the owner of the DT resources who accepts or rejects the suggested price and, when rejecting, the owner provides a different baseline price for one or more of the DT resources (which dynamic pricing tool 147 implements). In an embodiment, dynamic pricing tool 147 receives baseline prices from a user of client device 130 transmitted over network 110 for each of resources 146 in DT content store 145 on computing device 140. For example, Joe, the mining truck company owner, transmits the following baseline prices, which are received by the program on the laptop used by Bill, for the DT resources associated with the new truck model "SuperHaul": '$250' for the parts list; '$400' for the bill of material; '$300' for the maintenance manual; '$150' for the maintenance plan; and '$500' for the service manual.

According to an embodiment of the present invention, dynamic pricing tool 147 receives thresholds (step 230). In other words, responsive to receiving baseline prices for the DT resources available in the DT store, dynamic pricing tool 147 receives minimum and maximum threshold prices associated with each baseline price. In an embodiment, dynamic pricing tool 147 receives each threshold price from the owner of the DT resources. In another embodiment, dynamic pricing tool 147 suggests a price threshold for each DT resource to the owner of the DT resources who accepts or rejects the suggested threshold and, when rejecting, the owner provides a different threshold price for one or more of the DT resources (which dynamic pricing tool 147 implements). In one embodiment, the price thresholds are provided as a dollar amount (e.g., baseline price plus '$250' is the maximum threshold and baseline price minus '$100' is the minimum threshold). In another embodiment, the price thresholds are provided as percentages of the baseline price (e.g., baseline price plus '25%' is the maximum threshold and baseline price minus '15%' is the minimum threshold). In yet another embodiment, the price thresholds are provided as statistical deviations from the average sale price of the resource over a period of time (e.g., the maximum/minimum thresholds are plus/minus, respectively, three standard deviations of the average sale price over the last year). According to an embodiment, dynamic pricing tool 147 receives threshold prices from a user of client device 130 over network 110 for each of resources 146 in DT content store 145 on computing device 140. For example, Joe transmits the following thresholds to the program on the laptop computer used by Bill: plus '20%', minus '10%' for the parts list; plus '25%', minus '10%' for the bill of material; plus/minus '10%' for both the maintenance manual and the maintenance plan; and plus '40%', minus '5%' for the service manual.

In an embodiment, dynamic pricing tool 147 receives an indication of dynamic pricing (step 235). In other words, dynamic pricing tool 147 receives an indication from a DT resource owner that said owner wants to implement dynamic pricing for the DT resources available in the DT store. Further, the indication includes preferences for the types of physical asset data that will be monitored and used to drive potential price changes for the DT resources. According to an embodiment, dynamic pricing is indicated for all of the DT resources. According to another embodiment, dynamic pricing is indicated for a subset of the DT resources. According to yet another embodiment, dynamic pricing can be automatically enabled and disabled based on a calendar (e.g., resources popular during the winter have dynamic pricing enabled from November through March and dynamic pricing disabled in the other months of the year). According to yet another embodiment, dynamic pricing tool 147 can prompt the DT resource owner to enable dynamic pricing (when dynamic pricing has not been indicated by said owner) based on market changes identified by dynamic pricing tool 147 (e.g., dynamic pricing tool 147 identifies a service bulletin for a physical asset and dynamic pricing tool 147 prompts the user to enable dynamic pricing for DT resources associated with said physical asset). In an embodiment, dynamic pricing tool 147 receives an indication of dynamic pricing over network 110 from a user of client device 130 for each of resources 146, which are associated with physical asset 120, in DT content store 145 on computing device 140. For example, Joe indicates that dynamic pricing should be enabled for the DT resources associated with 'SuperHaul' but not enabled for the other products manufactured by the mining truck company and the indication is received by the program on the laptop used by Bill.

According to an embodiment of the present invention, dynamic pricing tool 147 monitors resource activity in market (step 240). In other words, responsive to receiving the pricing information for the DT resources, dynamic pricing tool 147 monitors the real-time DT resource activity in the market associated with the DT resources available in the DT content store. In an embodiment, dynamic pricing tool 147 also monitors the active usage patterns of the physical assets associated with the DT resources through one or more Internet of things sensors included in the physical assets; further, dynamic pricing tool 147 monitors the operational history of said physical assets. In an embodiment, dynamic pricing tool 147 monitors activity such as announcements concerning comparable DT resources and/or comparable physical assets (e.g., a recall for a common part found in any number of DT resources; an increase or decrease in sales of a physical asset; an introduction of a new physical asset into the market; an extension of a warranty for one or more parts; any new or updated maintenance bulletins for a part or set of parts for a physical asset, or for the physical asset itself; a change in production schedule due to a parts shortage; and the like). Please note that the previous list of monitored activities is not exhaustive; any number of activities may be monitored by dynamic pricing tool 147. According to an embodiment of the present invention, dynamic pricing tool 147 monitors, via network 110, market activity of both DT resources (such as resources 146) and physical assets (such as physical asset 120) and the operational history of said physical assets. For example, the program on the laptop used by Bill monitors, via the Internet, market activity for mining trucks that Joe is interested in following.

In an embodiment, dynamic pricing tool 147 identifies market change affecting resources (step 245). In other words, dynamic pricing tool 147 identifies a change in the market, based on the previously described monitoring of the market activity of DT resources and physical assets that may affect the price of one or more DT resources. According to an embodiment, an identified change in the market includes, but is not limited to, a part recall, a recall of an entire physical asset, an introduction of a new product from a competitor, a change to a component part in an assembly, a change in the supplier of one or more parts, an update to a bill of material, a service bulletin for a physical asset, a warranty change or extension, and the like. According to the embodiment, dynamic pricing tool 147 uses natural language processing (NLP), AI, ML, and any other techniques known in the art to monitor the market and identify changes that may affect DT resource pricing. In an embodiment, dynamic pricing tool 147 identifies a change in the market that may affect the price of resources 146 in DT content store 145 on computing device 140. For example, the program on the laptop used by Bill identifies that a recall has been issued from the manufacturer for the oil pump used in a truck called 'MaxMover' which is built by a competitor of Joe and his company.

According to an embodiment of the present invention, dynamic pricing tool 147 determines a price adjustment (step 250). In other words, responsive to identifying a change in the market which affects one or more DT resources, dynamic pricing tool 147 determines (i.e., calculates) an appropriate price adjustment (i.e., an adjustment value) based on the market. In an embodiment, the price adjustment determined by dynamic pricing tool 147 may be an increase in price when dynamic pricing tool 147 determines a possible increase in demand for DT resources. In another embodiment, the price adjustment determined by dynamic pricing tool 147 may be a decrease in price when dynamic pricing tool 147 determines a possible decrease in demand for a DT resource. In yet another embodiment, the price adjustment determined by dynamic pricing tool 147 may be one of an increase, a decrease, or no adjustment in price based on the specific circumstances associated with the identified change in the market (e.g., even though demand for a DT resource may increase based on an active market change (which indicates an increase in price for the DT resource), an opportunity to increase market share may indicate a decrease in the DT resource price). According to an embodiment, responsive to the identified market change, dynamic pricing tool 147 determines a price adjustment calling for a price increase for resources 146 in DT content store 145 on computing device 140. For example, based on the recall of the 'MaxMover' oil pump, the program on the laptop used by Bill determines a recommended price increase of maximum threshold price plus '$50' for each of the four DT resources associated with 'SuperHaul'.

In an embodiment, dynamic pricing tool 147 determines whether the adjustment value exceeds a threshold (decision step 255). In other words, responsive to determining a price adjustment, dynamic pricing tool 147 determines whether the determined price adjustment value exceeds a minimum or a maximum price adjustment threshold previously received. In one embodiment (decision step 255, NO branch), dynamic pricing tool 147 determines that neither a minimum nor a maximum price adjustment threshold was exceeded; therefore, dynamic pricing tool 147 proceeds to step 260 to adjust the price. In the embodiment (decision step 255, YES branch), dynamic pricing tool 147 determines that one of a minimum or a maximum price adjustment threshold was exceeded; therefore, dynamic pricing tool 147 proceeds to step 265 to transmit a prompt to the owner of the DT resource(s).

According to an embodiment of the present invention, dynamic pricing tool 147 adjusts the price (step 260). In other words, responsive to determining that the determined price adjustment does not exceed a threshold, dynamic pricing tool 147 updates the current price of the one or more DT resources. In an embodiment, the new price associated with the determined price adjustment value is equal to one of the minimum or maximum price thresholds received from the DT resource owner (e.g., for a baseline price of '$400' for a bill of material (BOM) for 'SuperHaul', the new price for the BOM is one of '$360' (if the price is to be reduced to the minimum price threshold of minus '10%'), or '$500' (if the price is to be increased to the maximum price threshold of plus '25%')). In another embodiment, the new price associated with the determined price adjustment value is in-between the baseline price and one of the minimum price threshold (e.g., for a baseline price of '$400' for the BOM and a minimum threshold of minus '10%', the new price for the BOM is between '$360' and '$400'), or the maximum price threshold (e.g., for a baseline price of '$400' for the bill of material and a maximum threshold of plus '25%', the new price for the BOM is between '$400' and '$500'). According to an embodiment, dynamic pricing tool 147 adjusts the price of resources 146 in DT content store 145 on computing device 140 based on the determined price adjustment. For example, the program on the laptop used by Bill increases the prices of each of the 'SuperHaul' DT resources (i.e., the parts list, BOM, maintenance manual, maintenance plan, and service manual) to the maximum price allowed by the maximum threshold. Therefore, the price of the parts list is increased to '$300', the price of the BOM is increased to '$500', the price of the maintenance manual is increased to '$330', the price of the maintenance plan is increased to '$165', and the price of the service manual is increased to '$700'.

In an embodiment, dynamic pricing tool 147 transmits a price prompt to the owner (step 265). In other words, responsive to determining that the determined price adjustment value exceeds one of the minimum price threshold and the maximum price threshold, dynamic pricing tool 147 transmits a price prompt to the DT resource owner. According to an embodiment, the prompt to the DT resource owner may be transmitted using any technology known in the art (e.g., an e-mail, a text, a pop-up message (a.k.a. a toast), etc.). According to the embodiment, the prompt includes, but is not limited to, the DT resource(s), the associated baseline price(s), the associated price thresholds, the associated determined price adjustments (which exceed one of the minimum or the maximum price thresholds), and a request to indicate an approval or rejection of the determined price adjustment. In an embodiment, dynamic pricing tool 147 transmits a prompt via network 110 to client device 130 which is being used by the owner of resources 146. For example, the program on the laptop used by Bill transmits a prompt to Joe (the owner of the DT resources for 'Super-Haul') indicating that the determined price adjustment value for the BOM is an increase in price of '$150' which makes the new price '$550' for the BOM, which exceeds the threshold price maximum of '$500'.

According to an embodiment, dynamic pricing tool 147 determines whether the transmitted price was approved (decision step 270). In other words, dynamic pricing tool 147 determines whether an approval indication was received from the DT resource owner in response to the transmitted response. In one embodiment (decision step 270, YES branch), dynamic pricing tool 147 determines that an approval indication was received from the DT resource owner; therefore, dynamic pricing tool 147 returns to step 260 to adjust the price based on the determined price adjustment value even though said adjustment exceeds one of the minimum or the maximum price adjustment. In the embodiment (decision step 270, NO branch), dynamic pricing tool 147 determines that an approval indication was not received from the DT resource owner; therefore, dynamic pricing tool 147 proceeds to step 275 to set the new price(s) of the DT resource(s).

In an embodiment, dynamic pricing tool sets price (step 275). In other words, responsive to determining that the determined price adjustment, transmitted in a prompt to the DT resource owner, was not approved by said owner, dynamic pricing tool sets the price of the DT resource based on an input from said owner. According to a first embodiment, the input of the owner may indicate a new price for the DT resource that is above the determined price adjustment. Consider an example DT resource with a baseline price of '$100' and minimum and maximum price thresholds of plus/minus '10%' resulting in a minimum price of '$90' and a maximum price of '$110'. In the example, the determined price adjustment value is plus '$25' bringing the new price to '$125'; thus, in this first embodiment, the owner may input a price of '$130'). According to a second embodiment, the input of the owner may indicate a new price that is below the determined price adjustment value but above the maximum price threshold (e.g., a new price of '$120'). According to a third embodiment, the input of the owner may indicate a new price that is below the maximum price threshold but above the baseline price (e.g., a new price of '$105').

According to a fourth embodiment, the input of the owner may indicate a new price that is below the baseline price but above the minimum price threshold (e.g., a new price of '$95'). According to a fifth embodiment, the input of the owner may indicate a new price that is below the minimum price threshold (e.g., a new price of '$80'). According to a sixth embodiment, the input of the owner may indicate a new price equivalent to one of the minimum or the maximum price threshold (e.g., a new price of either '$90' or '$110). In an embodiment, dynamic pricing tool 147 sets a new price for the DT resource based on an input from the DT resource owner. For example, Joe decides that even though there is a recall for the oil pump used in 'MaxHaul' (the truck from a competitor), he wants to try to attract new customers rather than take advantage of the situation and thus, Joe inputs a new price for the BOM of '$300', lowering the baseline price by '$100' (even though the determined price adjustment, based on the oil pump recall, was a price increase of '8150' to a new price of '$550').

Figure 3:
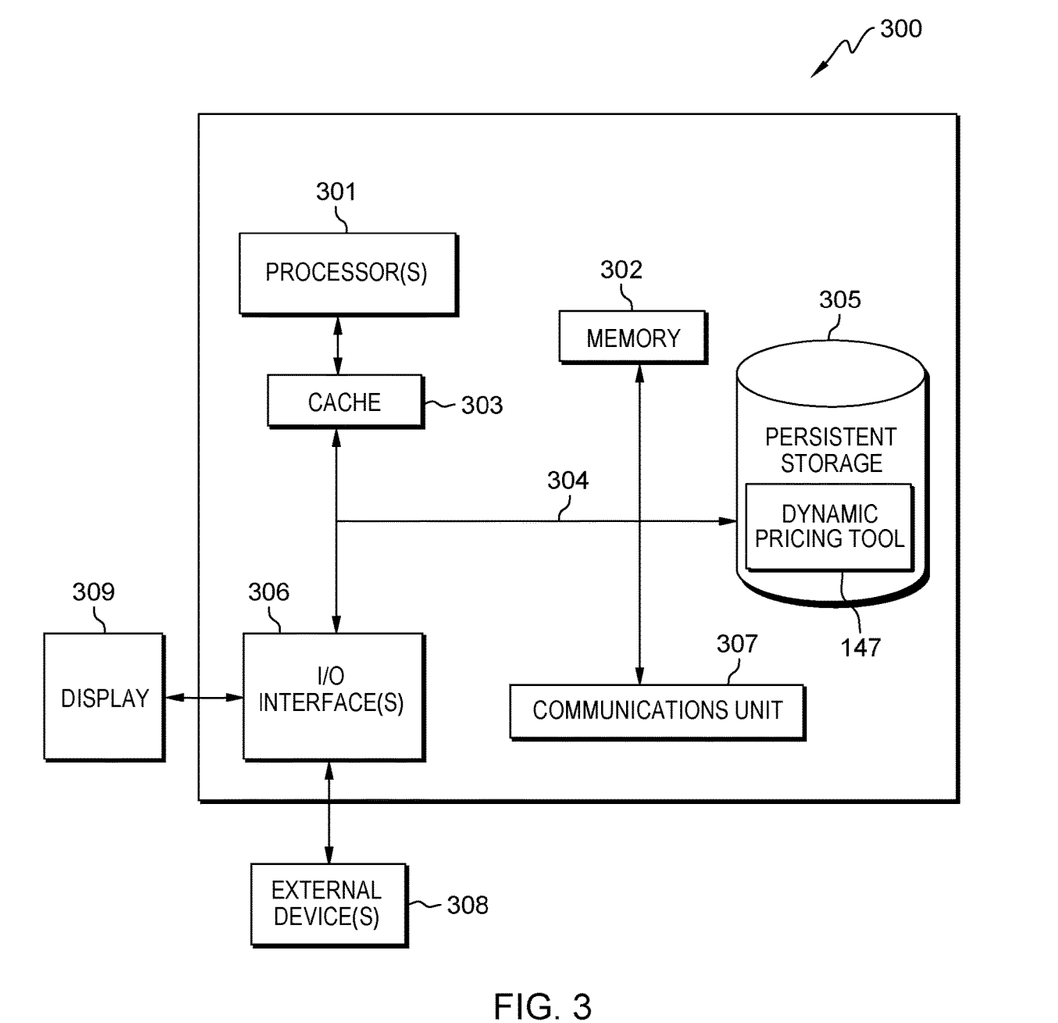
FIG. 3 depicts a block diagram of components of a computing device executing a dynamic pricing tool within the computing environment of FIG. 1, in accordance with an embodiment of the present invention.

FIG. 3 depicts computer system 300, which is an example of a system that includes dynamic pricing tool 147. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
    monitoring, by one or more computer processors, real-time market activity of one or more physical assets via a plurality of Internet of Things sensors and operational history of each physical asset of the one or more physical assets;
    monitoring, by one or more computer processors, one or more digital twin resources associated with each physical asset of the one or more physical assets;
    identifying, by one or more computer processors, at least one market change which affects at least one of the monitored one or more physical assets and the respectively associated monitored one or more digital twin resources associated with each physical asset of the one or more physical assets;
    calculating, by one or more computer processors, an adjustment value for a digital twin resource available for purchase; and
    responsive to determining that the calculated adjustment value does not exceed a price threshold amount, adjusting, by one or more computer processors, a price of the digital twin resource available for purchase based on the calculated adjustment value.

2. The method of claim 1, further comprising:
    responsive to determining that the calculated adjustment value does exceed the price threshold amount, transmitting, by one or more computer processors, a price prompt associated with the digital twin resource available for purchase; and
    responsive to determining that a response to the transmitted price prompt was not received, adjusting, by one or more computer processors, the price of the digital twin resource available for purchase based on the transmitted price prompt.

3. The method of claim 2, further comprising:
    responsive to determining that a response to the transmitted price prompt was received, setting, by one or more computer processors, a new price for the digital twin resource available for purchase based on an indication in the received response.

4. The method of claim 1, further comprising:
    receiving, by one or more computer processors, one or more digital twin resources;
    creating, by one or more computer processors, a digital twin store which includes the one or more digital twin resources displayed in a user interface which is dynamically configured to display the one or more digital twin resources;
    collecting, by one or more computer processors, a plurality of data from a set of physical assets associated with the one or more digital twin resources;
    publishing, by one or more computer processors, the digital twin store;
    receiving, by one or more computer processors, a baseline price for each digital twin resource of the one or more digital twin resources;
    receiving, by one or more computer processors, a minimum price threshold amount and a maximum price threshold amount associated with each baseline price for each digital twin resource of the one or more digital twin resources; and
    receiving, by one or more computer processors, an indication of dynamic pricing for each of the one or more digital twin resources.

5. The method of claim 4, wherein the plurality of data from the set of physical assets is collected from one or more sensors included on each of the physical assets in the set of physical assets.

6. The method of claim 1, wherein the at least one market change includes at least one of a recall of a part, a recall of an entire physical asset, an introduction of a new product from a competitor, a change to a component part in an assembly, a change in a part supplier, an update to a bill of material, a service bulletin for a physical asset, and a warranty change or extension.

7. The method of claim 1, wherein the adjustment value is at least one of a dollar amount deviation from a baseline price of the digital twin resource, a percentage deviation from the baseline price of the digital twin resource, and a statistical deviation from the baseline price of the digital twin resource, wherein the statistical deviation is based on an average sale price of the digital twin resource over a period of time.

8. A computer program product, the computer program product comprising:
    one or more non-transitory computer readable storage media; and
    program instructions stored on the one or more non-transitory computer readable storage media, the program instructions comprising:
        program instructions to monitor real-time market activity of one or more physical assets via a plurality of Internet of Things sensors and operational history of each physical asset of the one or more physical assets;
        program instructions to monitor one or more digital twin resources associated with each physical asset of the one or more physical assets;
        program instructions to identify at least one market change which affects at least one of the monitored one or more physical assets and the respectively associated monitored one or more digital twin resources associated with each physical asset of the one or more physical assets;
        program instructions to calculate an adjustment value for a digital twin resource available for purchase; and
        responsive to determining that the calculated adjustment value does not exceed a price threshold amount, program instructions to adjust a price of the digital twin resource available for purchase based on the calculated adjustment value.

9. The computer program product of claim 8, further comprising program instructions stored on the one or more computer readable storage media, to:
responsive to determining that the calculated adjustment value does exceed the price threshold amount, transmit a price prompt associated with the digital twin resource available for purchase; and
responsive to determining that a response to the transmitted price prompt was not received, adjust the price of the digital twin resource available for purchase based on the transmitted price prompt.

10. The computer program product of claim 9, further comprising program instructions stored on the one or more computer readable storage media, to:
responsive to determining that a response to the transmitted price prompt was received, set a new price for the digital twin resource available for purchase based on an indication in the received response.

11. The computer program product of claim 8, further comprising program instructions stored on the one or more computer readable storage media, to:
receive one or more digital twin resources;
create a digital twin store which includes the one or more digital twin resources displayed in a user interface which is dynamically configured to display the one or more digital twin resources;
collect a plurality of data from a set of physical assets associated with the one or more digital twin resources;
publish the digital twin store;
receive a baseline price for each digital twin resource of the one or more digital twin resources;
receive a minimum price threshold amount and a maximum price threshold amount associated with each baseline price for each digital twin resource of the one or more digital twin resources; and
receive an indication of dynamic pricing for each of the one or more digital twin resources.

12. The computer program product of claim 11, wherein the plurality of data from the set of physical assets is collected from one or more sensors included on each of the physical assets in the set of physical assets.

13. The computer program product of claim 8, wherein the at least one market change includes at least one of a recall of a part, a recall of an entire physical asset, an introduction of a new product from a competitor, a change to a component part in an assembly, a change in a part supplier, an update to a bill of material, a service bulletin for a physical asset, and a warranty change or extension.

14. The computer program product of claim 8, wherein the adjustment value is at least one of a dollar amount deviation from a baseline price of the digital twin resource, a percentage deviation from the baseline price of the digital twin resource, and a statistical deviation from the baseline price of the digital twin resource, wherein the statistical deviation is based on an average sale price of the digital twin resource over a period of time.

15. A computer system, the computer system comprising:
one or more computer processors;
one or more computer readable storage media; and
program instructions stored on the one or more computer readable storage media for execution by at least one of the one or more computer processors, the program instructions comprising:
program instructions to monitor real-time market activity of one or more physical assets via a plurality of Internet of Things sensors and operational history of each physical asset of the one or more physical assets;
program instructions to monitor one or more digital twin resources associated with each physical asset of the one or more physical assets;
program instructions to identify at least one market change which affects at least one of the monitored one or more physical assets and the respectively associated monitored one or more digital twin resources associated with each physical asset of the one or more physical assets;
program instructions to calculate an adjustment value for a digital twin resource available for purchase; and
responsive to determining that the calculated adjustment value does not exceed a price threshold amount, program instructions to adjust a price of the digital twin resource available for purchase based on the calculated adjustment value.

16. The computer system of claim 15, further comprising program instructions stored on the one or more computer readable storage media for execution by at least one of the one or more computer processors, to:
responsive to determining that the calculated adjustment value does exceed the price threshold amount, transmit a price prompt associated with the digital twin resource available for purchase; and
responsive to determining that a response to the transmitted price prompt was not received, adjust the price of the digital twin resource available for purchase based on the transmitted price prompt.

17. The computer system of claim 15, further comprising program instructions stored on the one or more computer readable storage media for execution by at least one of the one or more computer processors, to:
responsive to determining that a response to the transmitted price prompt was received, set a new price for the digital twin resource available for purchase based on an indication in the received response.

\* \* \* \* \*